May 15, 1928. E. G. GOODWIN Re. 16,959

COUPLER SHANK AND YOKE CONNECTION

Original Filed July 15, 1926 2 Sheets-Sheet 1

INVENTOR.
E. G. GOODWIN
BY H. H. Snelling
ATTORNEY

May 15, 1928. E. G. GOODWIN Re. 16,959

COUPLER SHANK AND YOKE CONNECTION

Original Filed July 15, 1926 2 Sheets-Sheet 2

INVENTOR.
E. G. GOODWIN
BY H. H. Snelling
ATTORNEY

Reissued May 15, 1928. Re. 16,959

UNITED STATES PATENT OFFICE.

ERNEST G. GOODWIN, OF PELHAM, NEW YORK, ASSIGNOR TO STANDARD COUPLER COMPANY, OF NEW YORK, N. Y., A CORPORATION OF NEW JERSEY.

COUPLER SHANK AND YOKE CONNECTION.

Original No. 1,608,386, dated November 23, 1926, Serial No. 122,691, filed July 15, 1926. Application for reissue filed December 17, 1927. Serial No. 240,888.

This invention relates to railway draft rigging and particularly to the provision of an equalizer between the coupler shank and the yoke so as to lengthen the life of the parts by eliminating undue wear in some localized portion during angling and has for its principal object the provision of a more simple and efficient form of coupler shank which shall accommodate an equalizer and yet be thoroughly interchangeable with the standard equipment and be inexpensive.

When the slot in the standard coupler shank was only an eighth of an inch longer than the key, the strain was always entirely on one side of the yoke during angling movement and this led to experiments to permit lateral movement of the draw bar without disturbing the normal relation of the key to the yoke links whereby the stresses transmitted to the draft gear might be equalized. It was suggested that shims or bushings might be placed on both sides of the key, lengthening and widening the key slot thru the coupler shank for this purpose, the shims or bushings having curved faces for engaging similar faces of the draw bar slot, but almost invariably the center of curvature of both surfaces was in the center of the key.

Some of the devices might have been satisfactory if there were but one type of equipment on the market but unfortunately there are several styles of draft rigging parts and it is absolutely essential at the present day that a coupler shank to be satisfactory shall be interchangeable, that is, it must accommodate the vertical yoke attachment and provide for the Symington standard follower, in other words, it must absolutely interchange with standard D couplers all over the country for otherwise the railroads would have to stock two kinds of couplers if any one of them attempted to use a non-interchangeable device. It is particularly for this reason that the swivel butt couplers have not met with success in spite of the fact that they equalize the load on angle.

In the drawings:—

Figure 1:
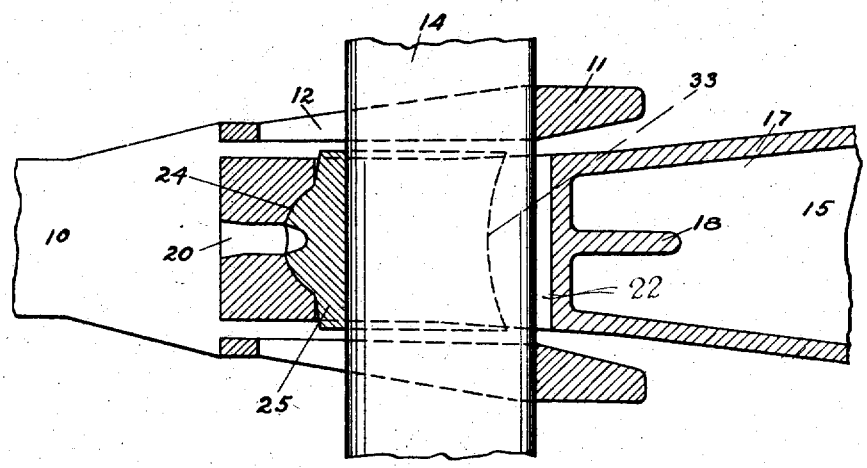
Figure 1 is a horizontal section thru a coupler shank and yoke connection involving the present invention.
Figure 2:
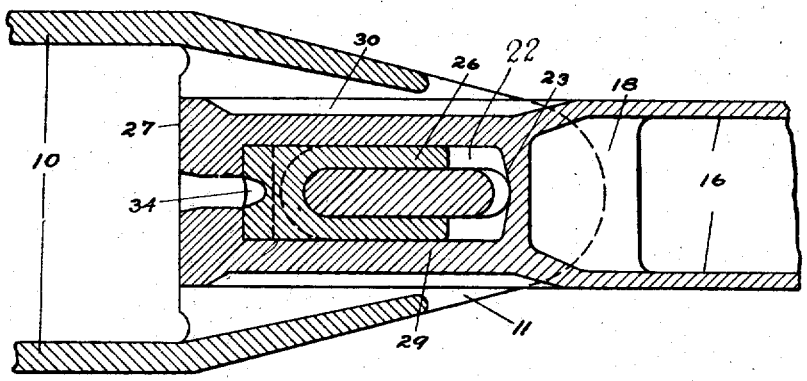
Figure 2 is a central, vertical section.
Figure 3:
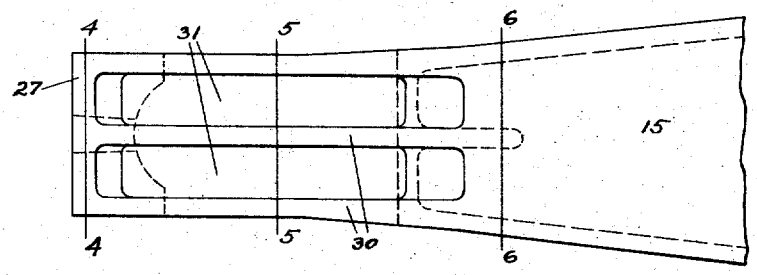
Figure 3 is a top plan view of the rear end of the coupler shank.
Figure 4:
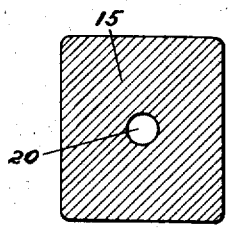
Figure 5:
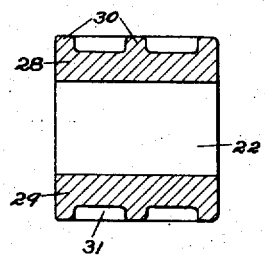
Figure 6:
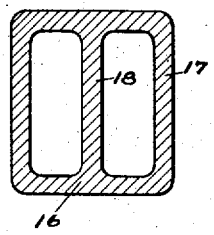

Figures 4, 5 and 6 are transverse vertical sections taken on lines 4—4, 5—5 and 6—6 of Figure 3.

In the specification and thruout the claims the word "length" will be used to denote distance in a forward and rearward direction as regards the railway car, "width" from side to side, and "depth" or "height" a measurement from top to bottom.

The yoke is numbered 10 and has the usual oppositely disposed flaring front walls 11 which have slots 12 therein to receive the key 14. The coupler shank which is denoted as a whole by the numeral 15, has flat top and bottom walls 16 and sloping side walls 17, the former strengthened by a vertical rib 18 to prevent bulging outward or collapsing inward of this position of the hollow stem in either buff or pull, this being accomplished with the side walls of the coupler as well as the inner rib and at the same time making a highly efficient design very simple to cast.

The rear end of the coupler shank is of solid metal except for the opening 20 to receive the usual follower lug, which opening communicates with the key-way slot 22 which is approximately twice as high as the key and is somewhat longer than the present standard of 6⅝ inches. The front wall 23 of the key slot is slightly concave vertically to allow a slight extra degree of angle while the rear wall of the key-way slot is deeply recessed as at 24 to receive a key equalizer 25, the arc of the concave recess preferably being struck from the rear edge of the key, that is, four inches forward of the rear face 27 of the shank.

Since the quantity of metal above and below the key-way slot must have a definite minimum value I find it highly advantageous to omit the usual cores and to have these walls 28 and 29 solid, with exterior ribs 30 formed by grooving the top and bottom faces as at 31. The key equalizer 25 is preferably quite a bit wider than the width of the rear end of the coupler shank. The top and bottom flanges 26 are integral with the rear of the equalizer and are preferably somewhat concave at their front portions as at 33 to facilitate insertion in the coupler. It will be noted that the body of metal at the rear end of the equalizer is ample to permit the provision of an opening 34 to receive the follower lug and yet maintain the required strength and rigidity.

In operation, the pull is straight on both sides of the yoke at all times and the equalizer remains constantly parallel to the key. The area of the bearing between the equalizer and the coupler is somewhat greater than between the usual coupler and key and the equalizer has more than ample stiffness by virtue of its greatly increased depth and the provision of the top and bottom flanges. With the longer key slot, the present standard is 6⅝ inches, small angles give an even bearing on both sides of the yoke but the key bears on one knife edge of the coupler which naturally will soon round up, wearing away the bearing to such an extent that on a straight pull the load will be in the center of the key only, and this in turn will bend the key after which there will be a further rounding away of the corners of the slot, a consequent further bending of the key, and so on.

What I claim is:—

1. A coupler shank having a transverse key-way slot of approximately twice the height of the standard 6″ by 1½″ key and more than one tenth longer than said standard key, the rear wall of the slot having an arcuate recess therein to receive a key equalizer, the radius of the arc being less than the distance from the center of the key to the surface arcuate.

2. The device of claim 1 in which the curve of the recess is an arc struck from the intersection of the center line of the gear and a vertical plane touching the rear of the key in its normal position.

3. A coupler shank having a key slot approximately twice as high and more than one tenth longer than a standard key, the rear wall of the slot being horizonally concave to receive a key equalizer, the walls above and below the slot being solid and ribbed externally and the rear end of the shank being solid except for the recess and a lug receiving opening communicating with said recess.

4. The device of claim 1 in which the portion of the shank in advance of the slot is tapered and hollow except for a central internal vertical rib to prevent bulging outward or collapsing inward of the hollow tapered portion of the stem.

5. In combination, a coupler key, an equalizer having forwardly extending flanges to receive a portion of the key snugly between them, an arcuate extension projecting rearwardly from the equalizer, a coupler shank having a transverse slot of such height as to receive snugly the equalizer and of side face length less than the over-all length of the assembled key and equalizer, the rear wall of said coupler slot having an arcuate recess therein to receive the equalizer extension, the axis of the surface of the arcuate recess lying in a transverse vertical plane rearward of the center of the coupler slot.

6. In combination, a coupler having an opening in the rear end thereof to receive a follower lug and also having a transverse slot, a slotted yoke, a key passing thru the alined slots of the coupler and yoke, an equalizer in the coupler slot extending beyond each side wall of the coupler and having a convex rear extension with a opening therein also to receive said follower lug, the rear wall of the coupler slot being on an arc struck from the rear edge of the key and said equalizer having top and bottom flanges extending above and below the key.

7. In combination, a slotted yoke, a slotted coupler having a concave recess at the rear of the slot of less diameter than the width of the coupler, a key, an equalizer surrounding the central portion of the key at rear, top and bottom, fitting the slot in the coupler, and having rotative engagement with said recess, said coupler and equalizer having communicating openings therein to receive a follower lug.

8. An equalizer consisting of a body, a convex extension projecting from the rear thereof and having its vertical axis in a central longitudinal plane and near the front surface of the body, a pair of flanges extending forwardly from the body approximately the length of a standard coupler key and spaced apart to receive such coupler key between them.

9. The device of claim 8 in which the front faces of the flanges are concave whereby the equalizer may be inserted in a coupler slot of less side face length than the over-all length of the equalizer.

10. A coupler shank of substantially uniform height having an opening therethrough, the wall on one side of the opening being solid and having an outside cavity.

11. A coupler shank of substantially uniform height having a key-way slot, the wall of the shank on each side of the slot being solid and having an external recess spaced away from each side edge and from the butt edge.

12. A coupler shank of substantially uniform height having a transverse key-way slot, the walls of the shank on each side of the slot being solid and each having a plurality of external recesses opening to one face only.

13. A coupler shank having a draft-key-opening therethrough located between substantially parallel walls at each side of the opening, said shank being of solid section surrounding said opening and having outside cored cavities formed in said parallel walls.

ERNEST G. GOODWIN.